_United States Patent_ [19]  [11] 3,708,267
Avogadro et al.  [45] Jan. 2, 1973

[54] METHOD OF PROCESSING NUCLEAR FUELS

[75] Inventors: Alessandro Avogadro, Varese, Italy; Joseph Wurm, Mol, Belgium

[73] Assignee: European Atomic Energy Community (Euratom), Kirchberg, Luxembourg

[22] Filed: Sept. 8, 1969

[21] Appl. No.: 856,171

[30]   Foreign Application Priority Data

Oct. 25, 1968  Netherlands ..........................6815301

[52] U.S. Cl. ....................................423/5, 423/11
[51] Int. Cl. ..................................................G21c 19/48
[58] Field of Search ..................................23/325, 332

[56]   References Cited

UNITED STATES PATENTS 3,011,865  12/1961  Benedict ..................................23/325
3,154,379  10/1964  Benedict ..................................23/325
3,160,470  12/1964  Lambert ...................................23/325

FOREIGN PATENTS OR APPLICATIONS 663,943  11/1965  Belgium ....................................23/325

_Primary Examiner_—Carl D. Quarforth
_Assistant Examiner_—R. E. Schafer
_Attorney_—Stevens, Davis, Miller & Mosher

[57]   ABSTRACT

In the processing of irradiated nuclear fuels containing uranium and plutonium, the fuel is first converted to a plutonium-containing alkali-metal uranate, and the uranate is suspended in a molten salt or salt mixture and treated with gaseous hydrogen chloride and oxygen, whereupon the uranium dissolved in the melt is separated from the undissolved plutonium compounds.

1 Claim, No Drawings

METHOD OF PROCESSING NUCLEAR FUELS

This invention relates to a method of processing uranium and plutonium containing irradiated nuclear fuels, in which the uranium from the fuel is converted into a plutonium-containing alkali-metal uranate.

A method of this type has been disclosed by British patent specification No. 1,108,042 according to which the nuclear fuel, which consists principally of uranium oxide or in which the uranium has previously been converted to the oxide, is treated in a molten basic alkali-metal compound in the presence of an oxidation agent, e.g. in molten NaOH or a mixture thereof with LiOH, in the presence of air, oxygen or sodium peroxide. From German patent specification No. 1,197,630 it is known to carry out this process in molten nitrates, e.g. $NaNO_3$. In these methods, the fuel forms as a pulverulent product which is insoluble in the melt and which consists principally of alkali-metal uranate, while those fission products which are gaseous at the treatment temperature (400° to 500° C.), e.g. krypton and xenon, escape and most of the fission products which are solid or liquid at said temperature, e.g. zirconium, niobium, cerium, barium and lanthanum and their compounds, dissolve in the melt.

Under the conditions described, plutonium forms insoluble compounds and on precipitation of the pulverulent alkali-metal uranate from the melt the material obtained is largely free of fission products but still contains all the plutonium originally present. Generally, this plutonium will be more valuable than the used and impoverished uranium and it is therefore important to separate it from the uranium in an optimum quantitative yield. If this can be done simply at the site of the nuclear reactor, the high costs of transportation of irradiated fuel elements to processing plants can be obviated.

U.S. Pat. No. 3,011,865 discloses a process in which a mixture of the oxides of uranium and plutonium is suspended in a molten salt or salt mixture and is treated at elevated temperature (above 750° C.) with a chlorination agent, namely $Cl_2$, $Cl_2$ plus HCl or with phosgene. The uranium and plutonium dissolve in the melt. The separation of these elements is then carried out by electrolysis or selective precipitation. Considerable disadvantages of this method are the high temperature required and the corrosion problems entailed, and the fact that the uranium and plutonium separation is not complete.

It has now been found that these disadvantages can be obviated or reduced while in addition it is advantageously possible to use plutonium-containing alkali-metal uranate obtained in the manner described hereinbefore, if, as constitutes the characteristic features of the invention said uranate is suspended in a molten salt or salt mixture and is treated with gaseous hydrogen chloride and oxygen, whereupon the uranium dissolved in the melt is separated from the undissolved plutonium compounds.

Preferably, in the method according to the invention, in a first stage, the nuclear fuel is oxidized in a molten salt bath consisting primarily of alkali-metal nitrates or peroxides. This oxidation, which can be carried out at a temperature below 450° C., yields a finely divided product which is insoluble in the melt and which consists principally of alkali-metal uranate and plutonium compounds. The oxidation is selective with respect to the fuel so that any cladding materials present, e.g. pieces of stainless steel or zirconium alloys, are not attacked. The volume of the fuel increases during this treatment so that it becomes completely detached from the cladding. If this treatment is applied to a fuel element which has been sawn open, e.g. a fuel rod clad with a stainless steel can, the can from which the fuel has been eliminated can be removed from the melt after some time while the alkali-metal uranate remains at the bottom of the crucible. This uranate is so finely divided that the subsequent chlorination can take place easily. The plutonium-containing uranate is then separated from the melt, e.g. by filtration over porous graphite and treated with hydrogen chloride and oxygen. To this end, it is first suspended in a molten salt or salt mixture, e.g. the eutectic mixture KCl and LiCl or of $MgCl_2$ and NaCl. During this chlorination, the uranate is selectively converted to uranyl chloride, which dissolves in the melt, while the plutonium remains in the form of insoluble compounds (oxide) and can be filtered off. To obtain optimum separation, it is preferable to use more, by volume, oxygen than hydrogen chloride gas, i.e. a gas mixture containing more than 50 percent of oxygen by volume.

It is important that this selective chlorination should take place at temperatures of 450° C. and lower, so that it can be carried out in a melting crucible consisting, for example, of pyrographite without special corrosion problems. After filtration of the solid plutonium compounds, the uranyl chloride in the melt can be converted in known manner to uranium oxide by means of gaseous ammonia or the melt can be reacted with magnesium oxide, uranium oxide being precipitated and the resulting magnesium chloride remaining in solution in the melt.

The resulting plutonium oxide can be purified in known manner. Apart from the decontamination of the uranium and plutonium in the first stage as already described, in the second stage of the method the plutonium is also separated from fission products such as the rare earths, chromium and strontium which were still present after the first stage and which dissolve in the melt in the form of their compounds.

Apart from materials such as pyrographite, the chlorination stage can also be carried out using conventional ceramic materials, e.g. $Al_2O_3$ or porcelain or ordinary graphite coated with a layer of silicon carbide. All the other treatments can be carried out by means of material which is less resistant to corrosion, e.g. stainless steel or other nickel alloys. Thus all the filtration operations can be carried out by means of filter plates consisting of metal or sintered ceramic material. After the second stage of the process, a filtration plate of this kind can be used simultaneously as a receiver and as a packaging material for the plutonium oxide deposit, so that the latter can be transported, without subsequent treatment, to the place where the final purification is carried out.

The method according to the invention will be more fully explained by the following examples:

EXAMPLE 1

Sintered tablets of $UO_2$ and 15 percent by weight of $PuO_2$ obtained by coprecipitation and sintering, and weighing approximately 1.8 g each were used as starting material. A table of this type was placed in a molten salt bath (approximately 4 g) consisting of a eutectic mixture of $NaNO_3$ and $KNO_3$ at 450° C. After a reaction period of 3 hours, the tablet was completely disintegrated and a brownish pulverulent deposit had formed. 58 g of a eutectic mixture of KCl and LiCl were added at the same temperature and a mixture of 20 percent by volume of HCl and 80 percent by volume of $O_2$ was passed through for a period of 2½ hours. After a decantation period of 10 minutes, a sample of about 3 g was taken from the melt. Analysis showed that no plutonium could be detected in the melt, while no uranium was present in the deposit.

EXAMPLE 2

This example was carried out under similar conditions to those described in Example 1 except that 1.32 g tablets were used consisting of $UO_2$ and 20 percent by weight of $PuO_2$, obtained by mechanically mixing the oxide powders and sintering.

No plutonium could be detected in the melt after sampling, while the uranium had completely dissolved.

We claim:

1. A process for the separation of plutonium oxide from a mixture comprising alkali metal uranates and plutonium compounds, comprising suspending said mixture in a molten salt bath comprising a salt selected from the group consisting of NaCl, $MgCl_2$, KCl, LiCl and mixtures thereof, sparging gaseous HCl and $O_2$ through said bath at a temperature of 450° C. or less, and separating the resulting precipitated plutonium oxide from the molten bath.

* * * * *